SCRIP FOR USE WITH PAPER SECURITY VALIDATION APPARATUS

Filed April 25, 1967

INVENTOR.
JACK E. BAYHA
BY
Oldham & Oldham
ATTORNEYS.

United States Patent Office 3,471,172
Patented Oct. 7, 1969

3,471,172

SCRIP FOR USE WITH PAPER SECURITY VALIDATION APPARATUS

Jack E. Bayha, Chesterland, Ohio, assignor to Transmarine Corporation, Chesterland, Ohio, a corporation of Ohio Filed Apr. 25, 1967, Ser. No. 633,564
Int. Cl. B42d *15/00*
U.S. Cl. 283—8 5 Claims

ABSTRACT OF THE DISCLOSURE

A scrip, normally made from paper, imprinted with a particular design utilizing pigmented ink and designed to be compared with a complementary design which blocks out all unprinted portions so that a measurement can be made of the electromagnetic radiation transmission characteristics of the pigmented ink on the scrip.

The authentication is achieved by utilizing techniques described in my co-pending U.S. application Ser. No. 529,750 filed Feb. 24, 1966, for "Paper Security Validation Apparatus."

It is well recognized that many problems are present with the use of paper money in the world today. Specifically, the fact that more and more paper money is in circulation today places a great burden on the banking system. Also, there is more and more tendency to attempt to counterfeit by those with criminal intentions. Further, the validation and/or authentication of paper securities by electrical or electronic authentication equipment is a difficult problem because of wear and tear on paper securities caused by the great use thereof and rapid turnover in a normal monetary system, and also because most of the paper money presently used in the world today was not particularly designed for validation with electrical or electronic apparatus. Hence, with the state of the art in paper security validation apparatus, only about a 95% accept level of genuine paper money can be obtained, and most validation apparatus is subject to compromise by a good counterfeit or even in some instances a photocopy of genuine paper money.

Therefore, a great problem in the use of paper money could be solved by issuing scrip in place thereof which is particularly designed for validation by electrical or electronic apparatus wherein the acceptance level of valid scrip would be nearly 100%, and the counterfeiting or compromising by photocopies of such scrip would be virtually impossible. Further, the use of such scrip could eliminate the circulation of paper security money thus easing the great burden on the banks as scrip could be designed for a one-time use. It is well recognized that scrip has been used as a provisional or temporary certificate which will be honored as money in times of shortage of currency. However, heretofore, the design of such scrip has not been to particularly satisfy authentication requirements for currency or document validation equipment. Such scrip is believed to represent an important new concept in the flow of money, and thus an advancement in the art.

Thus, to meet the objects of the inventions and the needs of the art, the invention contemplates a scrip which comprises a substantially flat, thin body which will pass at least a portion of radiated electromagnetic energy impinging thereon, and which is characterized by a plurality of groups of randomly arranged lined portions on the body at least one group of which will substantially impair the passage of radiated electromagnetic energy normally passed by the body, and whereby at least one group of the last-identified as at least one group will have lines equally spaced of a predetermined number per inch and at a predetermined angle and positional relation to the body so as to be capable of authentication by comparison to a grid of substantially the same number of lines per inch and angular position.

For a better understanding of the invention reference should be had to the accompanying drawings wherein.

Figure 1:
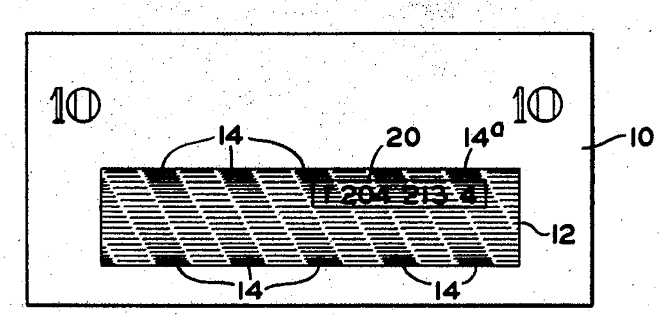
FIG. 1 is a plan view of a scrip note having printed thereon a group of lines only one of which meets the necessary requirements for validation.

It should be understood that the scrip of the invention is designed to cooperate for validation or authentication purposes with my co-pending application Ser. No. 529,750 filed Feb. 24, 1966, for "Paper Security Validation Apparatus." The basic teaching of this prior application is that paper securities can be validated by comparing portions thereof having closely positioned, equally spaced, substantially parallel lines to a grid of the substantially same number of lines per inch and angular relationship by moving the security and grid relative to each other to create a light-dark effect caused by the alignment and misalignment of the lines of the grid to the lines of the document, and measuring the intensity level of radiated electromagnetic energy passing through the document for at least two of the light-dark cycles.

Thus, to take advantage of the technique described in my above-identified application, this invention contemplates that the scrip, note, check, or the like will comprise a substantially flat, thin body normally made of paper printed with a plurality of security grids on the surface thereof at randomly positioned areas. Thus, the scrip shown in FIG. 1 comprises a body 10 which might be a high-grade bond paper, and for the purposes of representing a monetary value has been printed as being worth 10 units, with the unit representing any monetary value desired. A rectangularly-shaped section 12 has a plurality of security grids 14 printed thereon at slightly angled relationship thereto. For the purposes of authentication with the apparatus defined in my above-identified application, only that part of each grid 14 which has the lines of equal spacing with respect to each other can be used for validation. Thus, that part of each grid 14 wherein the lines are at variable spacing is only to confuse anyone attempting to copy or counterfeit same. However, the criticality of authentication with my above-identified apparatus is such that the change in number of lines per inch of only a very small percentage, and one which is not visible to the human eye, can control the particular grid which represents validation. Hence, for example, in the scrip of FIG. 1, only grid **14*a*** has the proper number of lines per inch to achieve validation with an appropriately positioned grid reticle in the apparatus of my above-identified application.

Specifically, it has been found that about a 5% to 7% variation in the number of lines per inch between the reticle and the lines on the bill will not produce the desired width of light-dark areas necessary to indicate validation. Hence, preferably the invention contemplates authentication of security grids having lines per inch of at least 50 as a bottom limit and 300 as a top limit whereby the 5%–7% variation from the count becomes almost imperceptible to the human eye. Further, lines of this number per inch are difficult to photocopy or duplicate by counterfeiting techniques to the resolution required. Thus, the grid 14*a* of FIG. 1, for example, has been set at 170 lines per inch with all other grids 14 being at least 7% greater or fewer in their lines per inch count so as to make validation thereof impossible with an appropriate reticle utilized in the apparatus defined in my above-identified application. The angular positioning of the grids 14 with respect to area 12 is to allow a slightly wider path or grid area for comparison with the grid carried by the reticle in the authentication apparatus. Further, it should be understood that since authentication can be achieved by a relative movement between the proper portion of the scrip and the grid of the reticle of between 1/16 and 1/8 inch, only an extremely small portion of the grid 14*a* need have the preselected 170 lines per inch designated as the authenticating arrangement. In other words, that portion of grid 14*a* just before the desired 170 lines per inch section comprising not over 3/16 inch in width might be well outside the 170 lines requirement and still not be detectable by the human eye. This may add one more bit of confusion to anyone trying to copy or compromise the scrip.

The test of genuineness of the scrip will in the preferred embodiment of the invention be differential absorption of transmitted infra-red radiation in the printed areas as against the unprinted areas of the preselected finely engraved portion of the scrip. The printed and unprinted areas are presented sequentially for detection of the amount of infra-red passage by means of a matching opaque grid moved relatively to the scrip. Naturally, while lines have been described as making up the printed portions of the grid and reticle, it should be understood that any complementary pattern between grid and reticle which achieves a comparison between infra-red passage in the printed and unprinted areas will achieve the objects of the invention.

Since the invention does require that authentication occur on the basis of light-dark counts caused by the comparison of printed and unprinted portions, the unprinted body 10 must be of such characteristic as to pass at least a portion of radiated electromagnetic energy impinging thereon. It has been found that energy in the infra-red spectrum can be most easily detected, and hence use of this type of electromagnetic energy is preferable, however, not essential. To make the grid properly function with the reticle in the validating apparatus, it is necessary that the authenticating group of lines representing the grid 14*a* be of such consistency so as to substantially impair the passage of the radiated electromagnetic energy normally passed by the body so that when the lines of grid 14*a* are out of register with the lines of the grid of the reticle, there will be ideally almost a total blackout or complete impairment of the passage of the electromagnetic energy, thus giving appropriate difference levels in the passage of electromagnetic energy to represent the light-dark areas for authentication purposes. It has been found that printing of the lines comprising grid 14*a* onto the body 10 will meet the objects of the invention if the printing is done by utilizing the intaglio method with a pigmented ink rather than a dye which provides a wide range of total effects and the necessary opaque qualities. The letterpress or planographic processes do not as fully achieve the desired radiation impairing characteristics necessary to achieve the objects of the invention. The raised nature of the impingement of the ink onto the body achieved by the intaglio method is illustrated in FIG. 4 of the drawings. Note the raised, equally spaced lines 16 and 18 making up the respective grids illustrated as being circular in FIG. 3 of the drawings.

Further, it should be understood that the optimum printing of the authenticating grid will cover about 50% of the surface area of the body in the region of printing, with the reticle grid also covering a 50% area. This gives the best blackout qualities for the best light-dark separations. However, it should be understood that the apparatus of my above-identified application will work very effectively without such sharply contrasting light-dark levels. In fact, a bottom limit to provide satisfactory levels for detection would be a 5% energy level change between the light and dark areas caused upon movement of the reticle relative to the document. Nevertheless, much more accurate determination of authentic scrip or documents over photocopies or counterfeit can be made by operating at higher energy difference levels. Hence the object of the invention is to provide a scrip which will authenticate at an energy difference level of at least 35%, and preferably over 50%.

Figure 2:
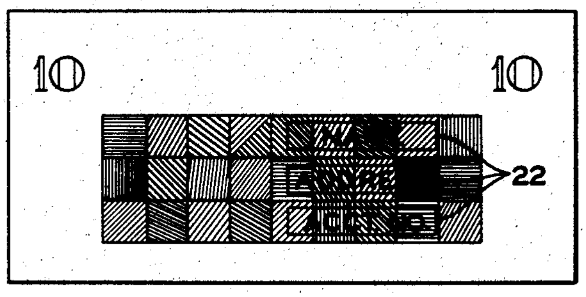
FIG. 2 is a modified embodiment of the scrip of FIG. 1 illustrating a plurality of substantially square blocks each of which carries lines of variable number per inch and angular relationship with respect to the other blocks, and which provides infinite combinations for authentication purposes.
Figure 3:
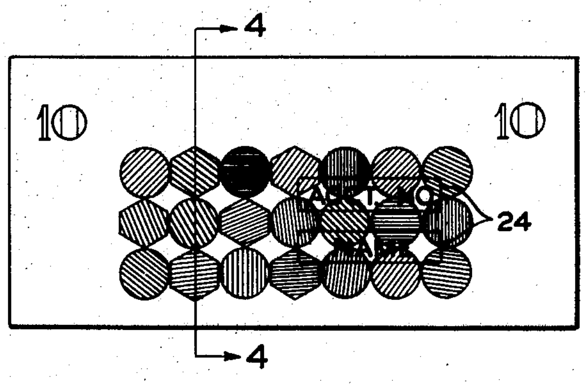
FIG. 3 is a further embodiment of the scrip of FIGS. 1 and 2 utilizing circular lined areas which can be easily controlled in the printing of the scrip as to angular disposition.
Figure 4:
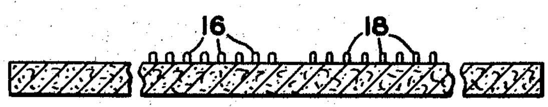
FIG. 4 is a cross-sectional elevational illustration showing the raised nature of the printed lines onto the scrip of FIG. 3 caused by the intaglio printing process, as taken on line 4—4 of FIG. 3.

The embodiments of the scrip illustrated in FIGS. 2 and 3 are modifications of that shown in FIG. 1 and simply provide a little more variation and infinite possibilities for confusion by placing a plurality of the grids in random arrangement adjacent to each other. Specifically, the scrip in FIG. 2 utilizes a total of 27 grid squares where the number of lines per inch and angular relation of each square varies from the other. The ability to select which square and which portion of that square represents the validating portion of the document becomes virtually impossible with this arrangement. Thus, the ability to detect and copy unlawfully is almost impossible.

Similarly, the arrangement of FIG. 3 presents the same infinite possibilities. In FIG. 3 some of the grids are circular shaped and some are hexagonal. The circular arrangement should lend itself to ready change to alter the scrip being printed by rotating the angular relation of the authenticating circular portion if it is noted that counterfeiting is taking place. Also, the hexagonal shape has certain benefits, since this would allow precise positions of accurate rotation and discrete angular value for each hexagonal printing unit. As stated previously, as little as a 5° rotation will make a grid not detectable by the apparatus of my above-identified application.

The potential number of separate forms of scrip, none of which would work in any machine except those designed to take a specific one, is almost infinite since there are at least 36 positions of rotation for each grid, at least about 20 different grid counts if lines are used, and an infinite number using other geometric designs, as well as a plurality of grids, any one of which could be used, and the possibility of using more than one grid to validate.

In order to eliminate the possibility that the scrip of the invention might be duplicated by photocopying because of the improved nature of photocopying equipment presently coming within the state of the art, it is contemplated that in all instances, the color of the grids printed onto the scrip will be of substantially or almost identically the same color as the body of the scrip, hence making it impossible to detect by photocopying, but which printing will achieve the necessary impairment of the electromagnetic energy impinging thereon to achieve the objects of the invention. This in the usual situation will be white printing on white paper.

If the scrip is issued to a particular individual or for a particular purpose it may contain identifying numbers such as shown by block 20 in FIG. 1, or name, address, and account numbers as indicated generally by numeral 22 in FIG. 2, or by an account number and name as indicated by number 24 in FIG. 3. Of course, these numbers, name, or address information will be printed in a contrasting color to the color of the body of the scrip. Further, in order to eliminate the possibility that the scrip might be authenticated, and thus receive recognition as monetary value even if the person's name, address, or account number is deleted therefrom either by marking it out, or cutting it out, it is contemplated that these numbers or other information will be positioned in relation to the authenticating grid or some other detection device so that any defacing thereof will automatically make the authentication of the scrip impossible. Note, that the account number 20 in FIG. 1 definitely extends over the authenticating grid 14*a*. The same would be true with regard to FIGS. 2 and 3.

Thus, it is seen that the objects of the invention are achieved by utilizing a thin body or piece of paper printed with security grids having selected configuration angle and position on the document wherein one or more of the grids will be capable of authentication so as to be detectable by scanning with a reticle having a grid therein of proper configuration, angle, and relation to the security grid. Preferably, the security grid is positioned behind the account number or other identifying printing on the scrip. There will always be a plurality of grids and any one or more of them will be selected on a predetermined basis as the one to be validated for the value of the scrip. In other words, this gives an infinite number of possibilities for authentication, and also for scrip value if this is desired. In other words, the scrip may all look the same to the human eye, but may validate differently in different apparatus depending upon the position of the validating grid reticle in the apparatus and the validating security grid in the scrip. The scrip is impossible to photocopy because of the use of white ink to form the security grids on a white background body, or similar color combinations between grid and body. The invention is designed specifically for measurement of the passage of radiated electromagnetic energy through the bill or scrip, rather than a reflected energy concept. Also, the measurement occurs because of the difference in energy passage as the grid is moved relative to the reticle in proper relationship caused by the light and dark areas created thereby. Preferably, the invention contemplates operating with an energy passage difference at least about 25%.

While in accordance with the patent statutes, only the best-known embodiment of the invention has been illustrated and described in detail, it is to be understood that the invention is not limited thereto or thereby, but that the inventive scope is defined in the appended claims.

What is claimed is:

1. A scrip note, check, or the like which comprises:

a substantially flat thin body which will pass a major portion of radiated electromagnetic energy impinging thereon, which is characterized by a plurality of groups of randomly arranged parallel line design portions on the body each bond within and filling one of a plurality of regular enmeshing geometric patterns, the lines of at least one group of which will impair the passage of radiated electromagnetic energy to less than 50% of that normally passed through the unprinted portions of the body, and whereby at least said one group will have a predetermined number of lines, and angular position with relation to the body so as to be capable of authentication by comparison to a separate complementary lined design which blocks energy passage through all non-printed portions of said one group.

2. A scrip note, check, or the like, according to claim 1 where the lines are straight and of various spacing to each other except for a sector between 1/16 to 3/16 inch in length where the spacing between lines is equal and of about 170 lines per inch.

3. A scrip note, check, or the like according to claim 1 where said one group of lines has ink characteristics so as to be substantially opaque to radiated electromagnetic energy in the infra-red region.

4. A scrip note, check, or the like according to claim 1 where the lines in the sector occupy about 50% of the surface area of the sector.

5. A strip according to claim 1 where printing is provided on the scrip to identify the owner thereof which has at least a portion of such printing positioned over at least one group having the predetermined number of lines per inch and angular relation to the body.

References Cited

UNITED STATES PATENTS

| | | | |
|---|---|---|---|
| 1,002,600 | 9/1911 | Morris et al. | 283—8.2 |
| 2,961,649 | 11/1960 | Eldridge et al. | |
| 2,964,641 | 12/1960 | Selgin. | |
| 3,031,076 | 4/1962 | De Claris et al. | |
| 3,245,534 | 4/1966 | Smith et al. | |
| 3,362,532 | 1/1968 | Riddle et al. | 209—111.8 X |

LAWRENCE CHARLES, Primary Examiner